US012686162B2

(12) United States Patent
Kim et al.

(10) Patent No.: US 12,686,162 B2
(45) Date of Patent: Jul. 21, 2026

(54) MICRO LENS ARRAY MOLDING APPARATUS

(71) Applicant: ANYCASTING CO., LTD., Seoul (KR)

(72) Inventors: Sungbin Kim, Seoul (KR); Chankyu Park, Gimpo-si (KR); Kunwoong Ko, Seoul (KR); Hyunsun Park, Gwangju (KR)

(73) Assignee: ANYCASTING CO., LTD., Seoul (KR)

( * ) Notice: Subject to any disclaimer, the term of this patent is extended or adjusted under 35 U.S.C. 154(b) by 167 days.

(21) Appl. No.: 18/715,110

(22) PCT Filed: Oct. 27, 2022

(86) PCT No.: PCT/KR2022/016539
§ 371 (c)(1),
(2) Date: May 30, 2024

(87) PCT Pub. No.: WO2023/128196
PCT Pub. Date: Jul. 6, 2023

(65) Prior Publication Data
US 2025/0026069 A1 Jan. 23, 2025

(30) Foreign Application Priority Data
Dec. 31, 2021 (KR) ........................ 10-2021-0194702

(51) Int. Cl.
*B29C 51/46* (2006.01)
*B29C 51/10* (2006.01)
(Continued)

(52) U.S. Cl.
CPC .............. *B29C 51/46* (2013.01); *B29C 51/10* (2013.01); *B29C 51/42* (2013.01);
(Continued)

(58) Field of Classification Search
CPC ......... B29C 51/46; B29C 51/10; B29C 51/42; B29C 2037/90; B29D 11/0442; B29D 11/0048
(Continued)

(56) References Cited

U.S. PATENT DOCUMENTS

2006/0113716 A1* 6/2006 Binda ................... B29C 66/832
264/545
2013/0193599 A1* 8/2013 Wrosz ..................... B29C 51/22
264/16

FOREIGN PATENT DOCUMENTS

JP 2007-326243 A 12/2007
JP 2011-104811 A 6/2011
(Continued)

OTHER PUBLICATIONS

International Search Report in International Application No. PCT/KR2022/016539, dated Mar. 31, 2023, 2pages.

*Primary Examiner* — Christina A Johnson
*Assistant Examiner* — Xue H Liu
(74) *Attorney, Agent, or Firm* — Park, Kim & Suh, LLC

(57) ABSTRACT

The present disclosure relates to a molding apparatus for manufacturing an optical component, such as a micro lens array, for use in a micro-LED display module. A molding apparatus according to one embodiment of the present disclosure may comprise: a lower base having a lower jig on which a drag is seated; an upper base located on one side of the lower base and having an upper jig on which a cope is seated; a first driving unit that turns the upper base over and positions same above the lower base; an alignment camera unit that detects an alignment between the cope seated on the upper jig and the drag seated on the lower jig when the upper base is located above the lower base; a second driving unit provided under the lower base to move the lower base; and
(Continued)

a control unit that aligns the drag and the cope by controlling the second driving unit according to the detection of the alignment camera unit.

12 Claims, 9 Drawing Sheets

(51) Int. Cl.
  *B29C 51/42*      (2006.01)
  *B29D 11/00*      (2006.01)
  *B29C 37/00*      (2006.01)
(52) U.S. Cl.
  CPC .... *B29D 11/00442* (2013.01); *B29D 11/0048* (2013.01); *B29C 2037/90* (2013.01)
(58) Field of Classification Search
  USPC ........................................................ 425/589
  See application file for complete search history.

(56)                    References Cited

FOREIGN PATENT DOCUMENTS

| | | | |
|---|---|---|---|
| JP | 2012-020401 | A | 2/2012 |
| JP | 2016-143875 | A | 8/2016 |
| KR | 10-2010-0064122 | A | 6/2010 |
| KR | 10-2021-0067023 | A | 6/2021 |

* cited by examiner

MICRO LENS ARRAY MOLDING APPARATUS

CROSS-REFERENCE TO RELATED APPLICATIONS

This application is the National Stage filing under 35 U.S.C. 371 of International Application No. PCT/KR2022/016539, filed on Oct. 27, 2022, which claims the benefit of Korean Patent Application No. 10-2021-0194702, filed on Dec. 31, 2021, the contents of which are all hereby incorporated by reference herein in their entirety.

TECHNICAL FIELD

The present disclosure relates to a molding apparatus for manufacturing an optical component such as a micro lens array used in a micro light emitting diode (LED) display module.

BACKGROUND ART

A micro light emitting diode (LED) is an ultra-small LED with a size of 100 μm or less (with a chip size of about 5 μm to about 100 μm). Due to a small size of a micro-LED, there is no problem of breaking when the micro-LED is bent, and thus the micro-LED is suitable for implementing a flexible screen, is far superior to the existing display in terms of color reproduction, power consumption, and response speed, and is also advantageous in implementing a large and transparent display.

Accordingly, micro-LED displays using micro-LED displays have recently attracted attention as next-generation displays.

While core materials of LCD and OLED are liquid crystal and organic materials, respectively, a micro-LED display refers to a display that uses a micro-LED chip itself with a size of about 5 μm to about 100 μm as a light emitting material.

Micro-LED displays have advantages over existing displays in terms of brightness, contrast ratio, energy efficiency, and response time, and in particular, may not only make VR/AR devices light and clear, but may also be enlarged, and also have a variety of potential application areas that attract attention even in the TV and sign lighting markets.

In such a micro-LED display, one pixel needs to be configured by three LED chips (red, green, and blue), and accordingly, each of red, green, and blue LED chips need to be sequentially assembled at designated positions on a substrate. In such a micro-LED display, one pixel needs to be configured by three LED chips (red, green, and blue), and accordingly, each of red, green, and blue LED chips need to be sequentially assembled at designated positions on a substrate.

To resolve this problem, a method of assembling a single-color micro-LED on a substrate and then converting the color of light emitted from an LED chip by using a phosphor may be considered. In this case, additional color conversion elements need to be applied to the respective micro-LEDs.

Korea Patent Publication No. 10-2021-0067023 (Published on Jun. 8, 2021) discloses "Micro lens array with color conversion function and micro-LED display module including the same".

A micro lens array (MLA) with a color conversion function according to the related art includes a lens unit protruding on one surface to one-to-one correspond to each of a plurality of micro-LEDs, a bank portion that is recessed inward to one-to-one correspond to each of the plurality of lens units at an opposite side, and a color converter provided in the bank portion to convert the color of light emitted from each of the plurality of micro-LEDs.

To manufacture a micro lens array having a color conversion function according to the related art, it is first necessary to manufacture a micro lens array including the lens unit and the bank unit.

DISCLOSURE

Technical Problem

An object of the present disclosure devised to resolve the problem lies on a molding apparatus for manufacturing optical components such as a micro lens array used in a micro light emitting diode (LED) display module.

An object of the present disclosure devised to resolve the problem lies on a molding apparatus for manufacturing optical components with different patterns on both surfaces.

Technical Solution

The object of the present disclosure may be achieved by providing a molding apparatus including a lower base including a lower jig on which a lower mold is accommodated, an upper base located at one side of the lower base and including an upper jig on which an upper mold is accommodated, a first driver configured to invert the upper base to position the upper base above the lower base, an alignment camera unit configured to detect alignment between the upper mold accommodated on the upper jig and the lower mold accommodated on the lower jig when the upper base is located above the lower base, a second driver provided below the lower base and configured to move the lower base, and a controller configured to control the second driver to align the lower mold and the upper mold with each other according to detection by the alignment camera unit.

In the molding apparatus according to an embodiment of the present disclosure, the lower jig may include a first heater configured to heat-cure thermosetting resin applied to the lower mold, and the upper jig may include a second heater configured to heat-cure thermosetting resin applied to the upper mold.

In the molding apparatus according to an embodiment of the present disclosure, the lower jig may include a first temperature sensor, the upper jig includes a second temperature sensor, and the controller may control the first heater according to detection of the first temperature sensor and controls the second heater according to detection of the second temperature sensor.

In the molding apparatus according to an embodiment of the present disclosure, the molding apparatus may include a manipulator configured to select whether to operate the first heater and the second heater, and an input unit configured to input a temperature of the lower jig and a temperature of the upper jig, the controller may operate or stop an operation of at least one of the first heater and the second heater according to selection of the manipulator, the controller may control the first heater depending on the temperature of the lower jig, input to the input unit, when operating the first heater, and the controller may control the second heater depending on the temperature of the upper jig, input to the input unit, when operating the second heater.

In the molding apparatus according to an embodiment of the present disclosure, the molding apparatus may include a vacuum device configured to generate a vacuum, the lower jig may include a first vacuum tube that is selectively connected to the vacuum device and fixes the lower mold by the vacuum generated by the vacuum device, and the upper jig may include a second vacuum tube that is selectively connected to the vacuum device and fixes the upper mold by the vacuum generated by the vacuum device.

In the molding apparatus according to an embodiment of the present disclosure, the molding apparatus may include a manipulator configured to select whether to fix the lower mold and the upper mold, and the controller may operate the vacuum device or stop an operation of the vacuum device according to selection of the manipulator and connects at least one of the first vacuum tube and the second vacuum tube to the vacuum device according to selection of the manipulator when operating the vacuum device.

In the molding apparatus according to an embodiment of the present disclosure, the molding apparatus may include a vacuum device configured to generate a vacuum, the first driver may include a linear driver configured to linearly move the upper base to an upper side of the lower base, and a rotation driver configured to invert the upper base by 180 degrees, the upper jig may include a second vacuum tube that is selectively connected to the vacuum device and fixes the upper mold by the vacuum generated by the vacuum device, the upper base may include a plate having a fixing groove to which the upper jig is fixed, and a coupling plate that is provided at an end of the plate and to which the rotation driver is coupled, the fixing groove may extend to the coupling plate, and a through hole through which the vacuum tube passes may be formed in the coupling plate.

In the molding apparatus according to an embodiment of the present disclosure, the first driver may include a linear driver configured to linearly move the upper base to an upper side of the lower base, and a rotation driver configured to invert the upper base by 180 degrees.

In the molding apparatus according to an embodiment of the present disclosure, the molding apparatus may include a manipulator configured to select a position of the upper base, and the controller may operate the first driver according to a position of the upper base, selected by the manipulator, to position the upper base above the lower base or to position the upper base at one side of the lower base.

In the molding apparatus according to an embodiment of the present disclosure, alignment holes may be formed in the upper mold and the upper jig, an alignment mark may be formed in the lower mold, a lower hole connected to the alignment hole may be formed in a lower portion of the upper base, the alignment camera unit may be located above the upper base to detect the alignment mark provided in the lower jig through the alignment hole and the lower hole when the upper base is located above the lower base, and the controller may control the second driver to align the upper mold and the lower mold with each other until the alignment camera unit detects the alignment mark through the alignment holes and the lower hole.

In the molding apparatus according to an embodiment of the present disclosure, the alignment camera unit may be located above the lower base, the molding apparatus may include a third driver configured to move the alignment camera unit in a vertical direction, and the controller may control the third driver to move the alignment camera unit upward when the upper base moves to an upper side of the lower base and to move the alignment camera unit downward to approach the upper base when the upper base is located above the lower base.

In the molding apparatus according to an embodiment of the present disclosure, the lower base may include a gap sensor configured to detect a gap between the lower base and the upper base, and the controller may control the second driver according to detection of the gap sensor to adjust the gap between the lower base and the upper base when the upper base is located above the lower base.

In the molding apparatus according to an embodiment of the present disclosure, the molding apparatus may include an input unit configured to input information about a gap between the upper base and the lower base, and the controller may control the second driver depending on the gap between the upper base and the lower base, input from the input unit.

Advantageous Effects

A molding apparatus having the above configuration according to an embodiment of the present disclosure may manufacture a micro lens array used in a micro light emitting diode (LED) display module.

A molding apparatus according to an embodiment of the present disclosure may manufacture optical components with different patterns on both surfaces.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

BEST MODE

Figure 1:
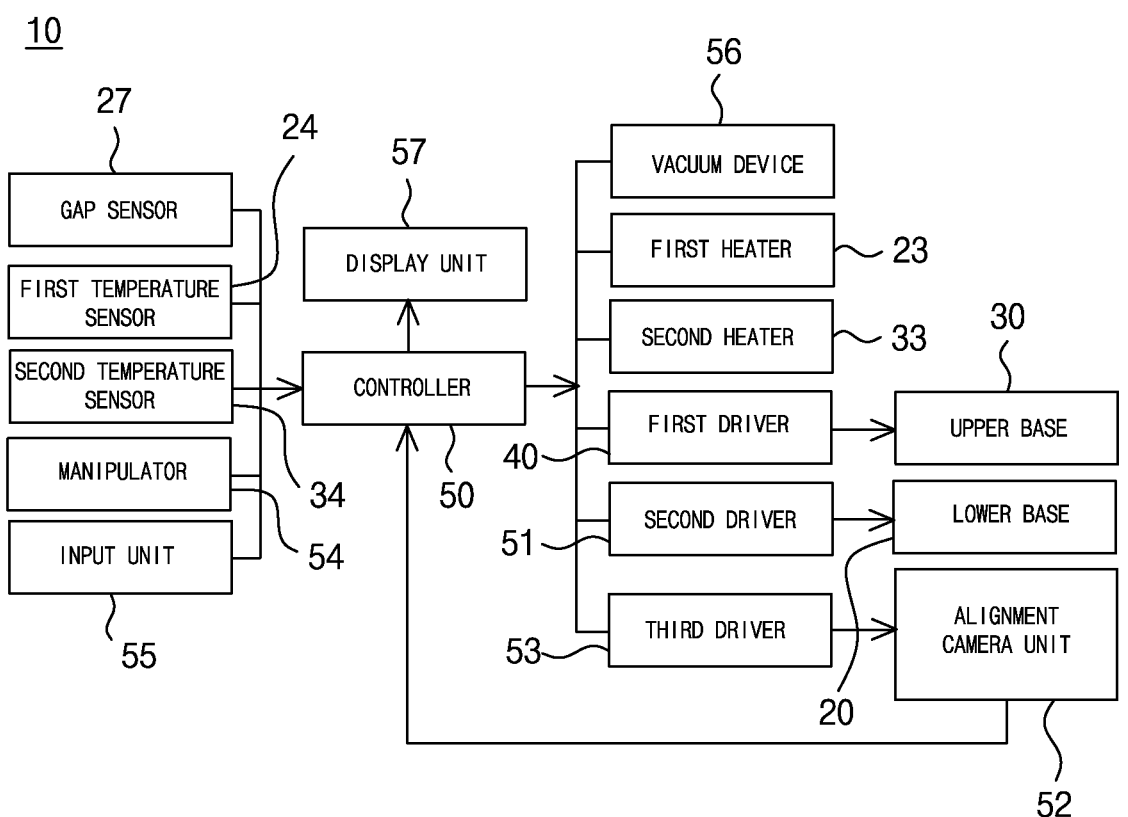
FIG. 1 is a configuration diagram of a molding apparatus according to an embodiment of the present disclosure.

Hereinafter, a molding apparatus according to an embodiment of the present disclosure will be described with reference to the attached drawings.

In the description of the drawings, the same elements are denoted by the same reference numerals, and a repeated explanation thereof will not be given.

The thickness or size of each layer (film), region, pattern, or structure in the drawing may be modified for clarity and convenience of description, and thus the present disclosure is not limited by a relative size or thickness shown in the attached drawings.

Embodiments may be implemented independently or together, and some components may be excluded in accordance with the purpose of the present disclosure.

Directional terms such as 'upper', 'lower', 'upper side', 'lower side', 'one side', 'other side', 'top', 'bottom', 'upward', and 'downward' are used in relation to the orientation of the drawings. Components according to embodiments of the present disclosure may be positioned in various orientations, and thus directional terms are used for illustrative purposes and is not limited thereto.

The terms such as "first" and "second" are used herein merely to describe a variety of constituent elements, but the constituent elements are not limited by the terms, and the terms are used only for the purpose of distinguishing one constituent element from another constituent element.

FIG. 1 is a configuration diagram of a molding apparatus according to an embodiment of the present disclosure.

Referring to FIG. 1, a molding apparatus 10 according to an embodiment of the present disclosure may include a lower base 20, an upper base 30 located on one side of the lower base 20, a first driver 40 that inverts the upper base 30 and positions the upper base 30 above the lower base 20, a second driver 51 that is provided below the lower base 20 and moves the lower base 20, an align camera unit 52 located above the lower base 20, a third driver 53 that moves the alignment camera unit 52, a manipulator 54, an input unit 55, a vacuum device 56, a display unit 57, and a controller 50.

Figure 2:
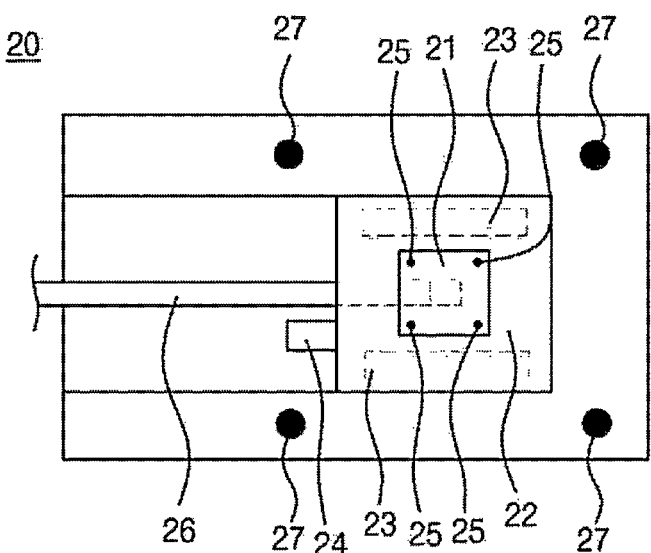
FIG. 2 is a schematic plan view of a lower base according to an embodiment of the present disclosure.

FIG. 2 is a schematic plan view of a lower base according to an embodiment of the present disclosure.

Referring to FIG. 2, the lower base 20 according to an embodiment of the present disclosure may include a lower jig 22 on which a lower mold 21 is accommodated.

The lower jig 22 may include a first heater 23 that heat-cures a thermosetting resin applied to the lower mold 21 and a first temperature sensor 24 that detects the temperature of the lower jig 22.

The controller 50 may control the first heater 23 according to detection by the first temperature sensor 24.

The manipulator 54 may be provided to select whether to operate the first heater 23, and the input unit 55 may be provided to input the temperature of the lower jig 22.

In this case, the controller 50 may operate or stop an operation of the first heater 23 according to selection of the manipulator 54, and when the first heater 23 is operated, the first heater 23 may be controlled according to the temperature of the lower jig 22 input from the input unit 55.

The vacuum device 56 may generate a vacuum, and the lower jig 22 may include a first vacuum tube 26 that is selectively connected to the vacuum device 56 to fix the lower mold 21 by the vacuum generated by the vacuum device 56.

The manipulator 54 may be provided to select whether or not the lower mold 21 is fixed.

In this case, the controller 50 may operate or stop the vacuum device 56 according to selection of the manipulator 54, and when the vacuum device 56 is operated, the first vacuum tube 26 may be connected to the vacuum device 56.

The lower mold 21 may include a plurality of alignment marks 25 for alignment with an upper mold 31, and the lower base 20 may include a plurality of gap sensors 27 that detect a gap between the lower base 20 and the upper base 30 when the upper base 30 is located above the lower base 20.

Figure 3:
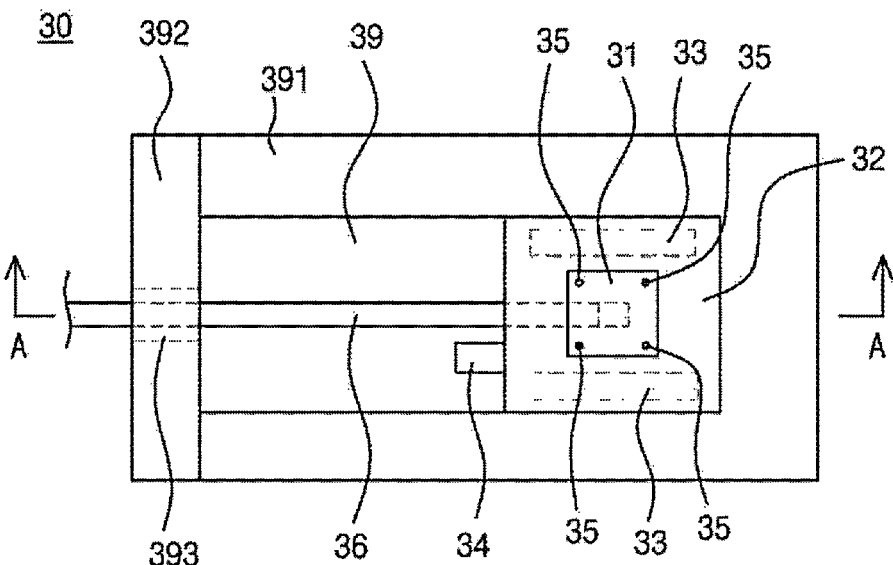
FIG. 3 is a schematic plan view of an upper base according to an embodiment of the present disclosure.
Figure 4:
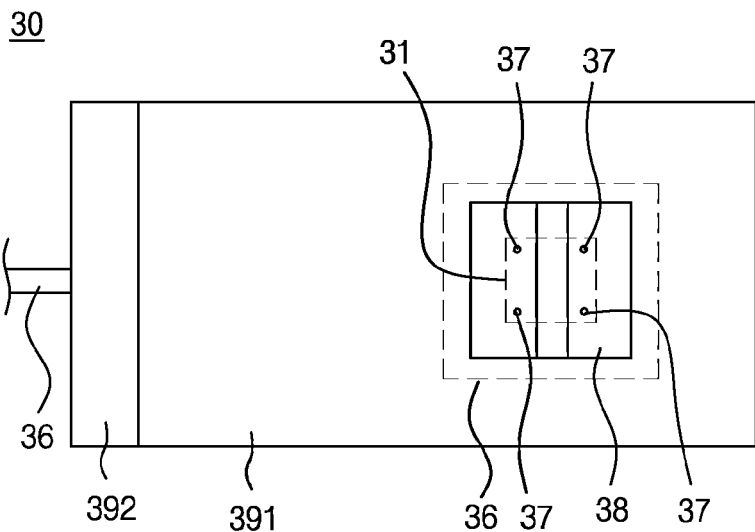
FIG. 4 is a schematic bottom view of the upper base of FIG. 3.
Figure 5:
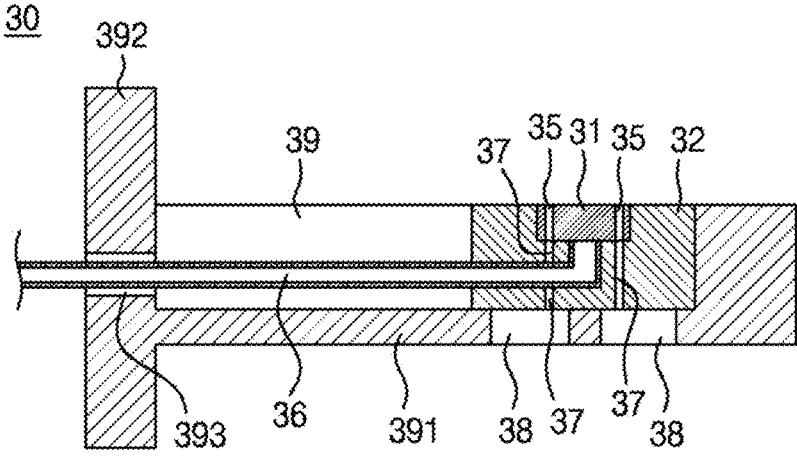
FIG. 5 is a cross-sectional view taken along A-A of FIG. 3.

FIG. 3 is a schematic plan view of an upper base according to an embodiment of the present disclosure, FIG. 4 is a schematic bottom view of the upper base of FIG. 3, and FIG. 5 is a schematic cross-sectional view taken along a line A-A of FIG. 3.

Referring to FIGS. 3 to 5, the upper base 30 according to an embodiment of the present disclosure may include an upper jig 32 on which the upper mold 31 is accommodated.

The upper jig 32 may include a second heater 33 that heat-cures a thermosetting resin applied to the upper mold 31 and a second temperature sensor 34 that detects the temperature of the upper jig 32.

The controller 50 may control the second heater 33 according to detection by the second temperature sensor 34.

The manipulator 54 may be provided to select whether to operate the second heater 33, and the input unit 55 may be provided to input the temperature of the upper jig 32.

In this case, the controller 50 may operate or stop an operation of the second heater 33 according to selection of the manipulator 54, and when the second heater 33 is operated, the second heater 33 may be controlled according to the temperature of the upper jig 32 input from the input unit 55.

The upper jig 32 may include a second vacuum tube 36 that is selectively connected to the vacuum device 56 and fixes the upper mold 31 by the vacuum generated by the vacuum device 56.

The manipulator 54 may be provided to select whether or not the upper mold 31 is fixed.

In this case, the controller 50 may operate or stop the vacuum device 56 according to selection of the manipulator 54, and when the vacuum device 56 is operated, the second vacuum tube 36 may be connected to the vacuum device 56.

A plurality of alignment holes 35 may be formed in the upper mold 31 for alignment with the lower mold 21, and as shown in FIG. 5, an alignment hole 37 connected to the alignment holes 35 may be formed in the upper jig 32, and a lower hole 38 connected to the alignment hole 37 may be formed in a lower portion of the upper base 30.

The upper base 30 may include a plate 391 including a fixing groove 39 to which the upper jig 32 is fixed, and a coupling plate 392 that is provided at an end of the plate 391 and to which a rotation driver 44 (refer to FIG. 6) is coupled.

The fixing groove 39 may extend to the coupling plate 392, and a through hole 393 through which the second vacuum tube 36 passes may be formed in the coupling plate 392.

Figure 6:
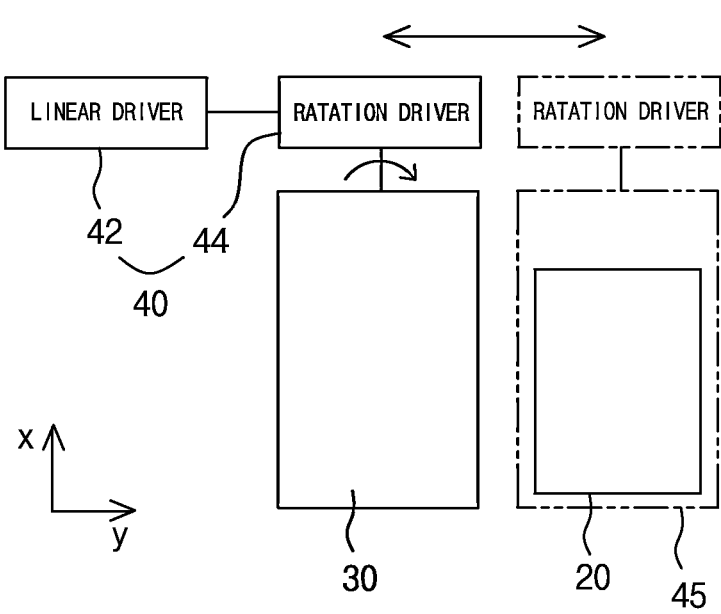
FIG. 6 is a diagram for explaining a first driver according to an embodiment of the present disclosure.

FIG. 6 is a diagram for explaining a first driver according to an embodiment of the present disclosure.

Referring to FIG. 6, the first driver 40 may be configured to invert the upper base 30 to position the upper base 30 on the lower base 20 and may include a linear driver 42 that moves the upper base 30 straight to an upper side of the lower base 20 (y-axis direction in the drawing), and the rotation driver 44 that inverts the upper base 30 by 180 degrees.

The linear driver 42 may include a linear motor, and the rotation driver 44 may include a turn motor.

When the controller 50 operates the first driver 40 to position the upper base 30 above the lower base 20, the controller 50 may operate the linear driver 42 to position the upper base 30 above the lower base 20 and may then operate the rotation driver 44 to invert the upper base 30 by 180 degrees.

Alternatively, when the upper base 30 is positioned above the lower base 20 and then the upper base 30 is inverted by 180 degrees, interference may occur due to the lower base 20 depending on a gap between the upper base 30 and the lower base 20, and thus the controller 50 may operate the rotation driver 44 to invert the upper base 30 by 180 degrees and may then operate the linear driver 42 to position the inverted upper base 30 above the lower base 20

The manipulator 54 may be provided to select the position of the upper base 30, and the controller 50 may operate the first driver 40 depending on the position selected by the manipulator 54 to position the upper base 30 above the lower base 20 or to position the upper base 30 at one side of the lower base 20.

Figure 7:
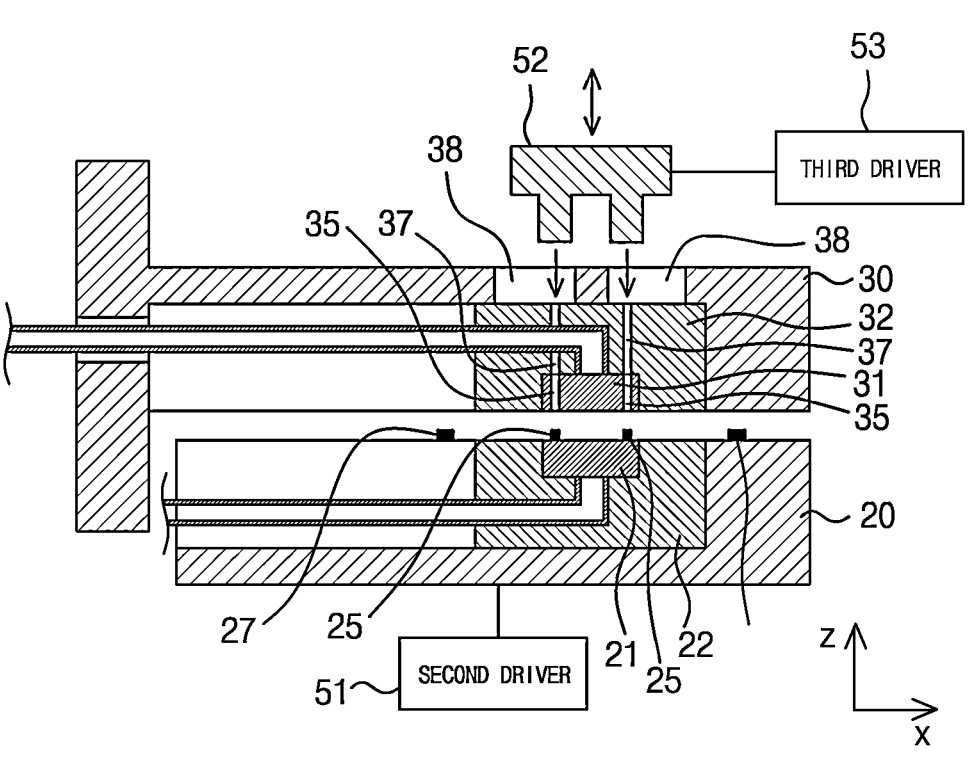
FIG. 7 is a schematic cross-sectional view showing a state in which an upper base is positioned above a lower base.

FIG. 7 is a schematic cross-sectional view showing a state in which an upper base is positioned above a lower base.

Referring to FIG. 7, when the upper base 30 is positioned above the lower base 20, the alignment camera unit 52 may detect alignment between the upper mold 31 accommodated on the upper jig 32 and the lower mold 21 accommodated on the lower jig 22, and the controller 50 may control the second driver 51 to align the lower mold 21 and the upper mold 31 with each other according to detection of the alignment camera unit 52.

For example, when the upper base 30 is located above the lower base 20, the alignment camera unit 52 may detect alignment between the lower mold 21 and the upper mold 31 by detecting the alignment mark 25 positioned above the upper base 30 and provided in the lower jig 22 through the alignment holes 35 and 37 and the lower hole 38.

Then, the controller 50 may control the second driver 51 to align the upper mold 31 and the lower mold 21 with each other until the alignment camera unit 52 detects the alignment mark 25 through the alignment holes 35 and 37 and the lower hole 38.

The alignment camera unit 52 may be located above the lower base 20, and when the upper base 30 is moved to an upper side of the lower base 20, the controller 50 may control the third driver 53 to move the alignment camera unit 52 upward.

Then, when the upper base 30 moves to an upper side of the lower base 20, the alignment camera unit 52 may be prevented from interfering with the movement of the upper base 30.

When the upper base 30 is located above the lower base 20, the controller 50 moves the alignment camera unit 52 downward to approach the upper base 30.

Then, the alignment camera unit 52 may easily detect the alignment mark 25 provided in the lower jig 22 through the alignment holes 35 and 37 and the lower hole 38.

The controller 50 may control the second driver 51 to move the lower base 20 to the upper base 30, and thus pressurize thermosetting resin applied to the lower mold 21 and thermosetting resin applied to the upper mold 31.

In this case, when the upper base 30 is located above the lower base 20, the controller 50 may control the second driver 51 according to detection of the gap sensor 27 to adjust a gap between the lower base 20 and the upper base 30.

The input unit 55 may be provided to input information about the gap between the upper base 30 and the lower base 20, and the controller 50 may control the second driver 51 according to the gap between the upper base 30 and the lower base 20, input to the input unit 55.

The second driver 51 may be provided to move the lower base 20 in three axes. Then, the controller 50 may align the lower mold 21 and the upper mold 31 with each other while moving the lower base 20 in the x-y axis and adjust the gap between the lower base 20 and the upper base 30 while moving the lower base 20 in the z-axis.

Hereinafter, an example of an operating order of the molding apparatus 10 according to an embodiment of the present disclosure will be described.

First, while positioning the upper base 30 at one side of the lower base 20, an operator accommodates the lower mold 21 and the upper mold 31 on the lower jig 22 and the upper jig 32, respectively, and then applies thermosetting resin onto the lower mold 21 and the upper mold 31.

Then, the operator operates the manipulator 54 to fix the lower mold 21 and the upper mold 31 to each other.

Then, the controller 50 operates the vacuum device 56 and connects the first vacuum tube 26 and the second vacuum tube 36 to the vacuum device 56, and thus the lower mold 21 and the upper mold 31 are fixed to the lower jig 22 and the upper jig 32 through vacuum adsorption by vacuum provided by the vacuum device 56.

Then, the operator manipulates the manipulator 54 to position the upper base 30 above the lower base 20.

Then, the controller 50 operates the rotation driver 44 of the first driver 40 to invert the upper base 30 and then operates the linear driver 42 to move the inverted upper base 30 to the upper side of the lower base 20.

In this case, when the alignment camera unit 52 is located above the lower base 20, the controller 50 operates the third driver 53 to move the alignment camera unit 52 upward not to interfere with movement of the upper base 30 before moving the upper base 30 to the upper side of the lower base 20.

Then, when the upper base 30 is located above the lower base 20, the controller 50 operates the third driver 53 to move the alignment camera unit 52 to approach the upper base 30.

Then, the controller 50 controls the second driver 51 to move the lower base 20 until the alignment camera unit 52 detects the alignment mark 25 through the alignment holes 35 and 37 and the lower hole 38, and thus align the upper mold 31 and the lower mold 21 with each other.

Here, the alignment operation may be performed by manipulation of the operator of the manipulator 54 or may be performed automatically without manipulation.

Then, the controller 50 controls the second driver 51 according to detection by the gap sensor 27 to move the lower base 20 to the upper base 30 and thus adjusts the gap between the lower base 20 and the upper base 30.

Then, thermosetting resin applied to the upper mold 31 and thermosetting resin applied to the lower mold 21 may be pressurized.

Here, the pressurization operation may be performed by manipulation of the operator of the manipulator 54 or may be performed automatically without manipulation.

Then, the controller 50 operates the first heater 23 and the second heater 33 to cure the thermosetting resin pressurized between the upper mold 31 and the lower mold 21.

Then, an optical product having a pattern formed on each of the upper mold 31 and the lower mold 21 may be manufactured.

Here, the curing operation may be performed by manipulation of the operator of the manipulator 54 or may be performed automatically without manipulation.

Accordingly, the molding apparatus having the above configuration according to an embodiment of the present disclosure may easily manufacture an optical component such as a micro lens array used in a micro-LED display module.

In particular, the molding apparatus according to an embodiment of the present disclosure may easily manufacture optical components with different patterns on both surfaces.

Figure 8:
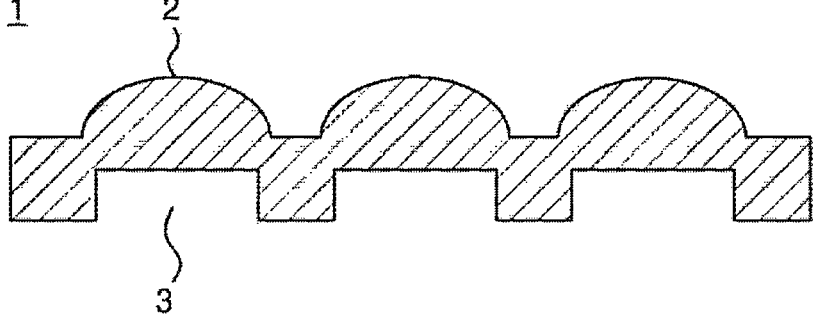
FIG. 8 is a schematic cross-sectional view of a micro lens array as an optical component according to an embodiment of the present disclosure.
Figure 9:
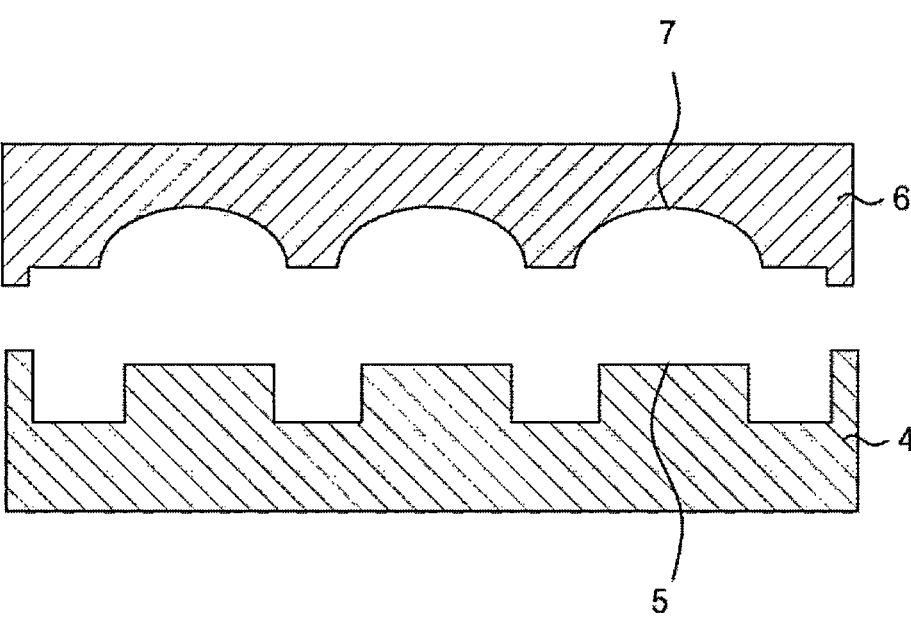
FIG. 9 is a schematic cross-sectional view for molding the micro lens array of FIG. 8.

FIG. 8 is a schematic cross-sectional view of a micro lens array as an optical component according to an embodiment of the present disclosure, and FIG. 9 is a schematic cross-sectional view of a mold for forming the micro lens array of FIG. 8.

Referring to FIGS. 8 and 9, a micro lens array (MLA) 1 according to an embodiment of the present disclosure may include a plurality of lens portions 2 protruding on one surface and a bank portion 3 that is recessed inwardly to correspond one-to-one to each of the plurality of lens portions 2, a protrusion 5 having a shape of the bank portion 3 may be formed on a lower mold 4 for manufacturing the MLA 1, and a recess 7 having a shape of the lens portion 2 may be formed on an upper mold 6 for manufacturing the MLA 1.

As described above, the present disclosure relates to a molding apparatus for manufacturing optical components such as a micro lens array used in a micro-LED display module, and an embodiment thereof may be changed in various forms. Therefore, the present disclosure is not limited to the embodiments disclosed in this specification, and any form to be modified by those skilled in the art to which the present disclosure pertains will also fall within the scope of the present disclosure.

The invention claimed is:

1. A molding apparatus comprising:
a lower base including a lower jig on which a lower mold is accommodated;
an upper base located at one side of the lower base and including an upper jig on which an upper mold is accommodated;
a first driver configured to invert the upper base to position the upper base above the lower base;
an alignment camera unit configured to detect alignment between the upper mold accommodated on the upper jig and the lower mold accommodated on the lower jig when the upper base is located above the lower base;
a second driver provided below the lower base and configured to move the lower base; and
a controller configured to control the second driver to align the lower mold and the upper mold with each other according to detection by the alignment camera unit,
wherein the lower jig includes a first heater configured to heat-cure thermosetting resin applied to the lower mold, and
the upper jig includes a second heater configured to heat-cure thermosetting resin applied to the upper mold.

2. The molding apparatus of claim 1, wherein the lower jig includes a first temperature sensor, the upper jig includes a second temperature sensor, and
the controller controls the first heater according to detection of the first temperature sensor and controls the second heater according to detection of the second temperature sensor.

3. The molding apparatus of claim 2, wherein the molding apparatus includes a manipulator configured to select whether to operate the first heater and the second heater, and an input unit configured to input a temperature of the lower jig and a temperature of the upper jig, the controller operates or stops an operation of at least one of the first heater and the second heater according to selection of the manipulator,
the controller controls the first heater depending on the temperature of the lower jig, input to the input unit, when operating the first heater, and
the controller controls the second heater depending on the temperature of the upper jig, input to the input unit, when operating the second heater.

4. The molding apparatus of claim 1, wherein the molding apparatus includes a vacuum device configured to generate a vacuum,
the lower jig includes a first vacuum tube that is selectively connected to the vacuum device and fixes the lower mold by the vacuum generated by the vacuum device, and
the upper jig includes a second vacuum tube that is selectively connected to the vacuum device and fixes the upper mold by the vacuum generated by the vacuum device.

5. The molding apparatus of claim 4, wherein the molding apparatus includes a manipulator configured to select whether to fix the lower mold and the upper mold, and
the controller operates the vacuum device or stops an operation of the vacuum device according to selection of the manipulator and connects at least one of the first vacuum tube and the second vacuum tube to the vacuum device according to selection of the manipulator when operating the vacuum device.

6. The molding apparatus of claim 1, wherein the molding apparatus includes a vacuum device configured to generate a vacuum,
the first driver includes a linear driver configured to linearly move the upper base to an upper side of the lower base, and a rotation driver configured to invert the upper base by 180 degrees,
the upper jig includes a vacuum tube that is selectively connected to the vacuum device and fixes the upper mold by the vacuum generated by the vacuum device,
the upper base includes a plate having a fixing groove to which the upper jig is fixed, and a coupling plate that is provided at an end of the plate and to which the rotation driver is coupled,
the fixing groove extends to the coupling plate, and
a through hole through which the vacuum tube passes is formed in the coupling plate.

7. A molding apparatus comprising:
a lower base including a lower jig on which a lower mold is accommodated;
an upper base located at one side of the lower base and including an upper jig on which an upper mold is accommodated;
a first driver configured to invert the upper base to position the upper base above the lower base;
an alignment camera unit configured to detect alignment between the upper mold accommodated on the upper jig and the lower mold accommodated on the lower jig when the upper base is located above the lower base;
a second driver provided below the lower base and configured to move the lower base; and
a controller configured to control the second driver to align the lower mold and the upper mold with each other according to detection by the alignment camera unit,
wherein the first driver includes a linear driver configured to linearly move the upper base to an upper side of the lower base, and a rotation driver configured to invert the upper base by 180 degrees.

8. A molding apparatus comprising:

a lower base including a lower jig on which a lower mold is accommodated;

an upper base located at one side of the lower base and including an upper jig on which an upper mold is accommodated;

a first driver configured to invert the upper base to position the upper base above the lower base;

an alignment camera unit configured to detect alignment between the upper mold accommodated on the upper jig and the lower mold accommodated on the lower jig when the upper base is located above the lower base;

a second driver provided below the lower base and configured to move the lower base; and a controller configured to control the second driver to align the lower mold and the upper mold with each other according to detection by the alignment camera unit, wherein the molding apparatus includes a manipulator configured to select a position of the upper base, and the controller operates the first driver according to a position of the upper base, selected by the manipulator, to position the upper base above the lower base or to position the upper base at one side of the lower base.

9. The molding apparatus of claim 8, wherein alignment holes are formed in the upper mold and the upper jig, an alignment mark is formed in the lower mold, a lower hole connected to the alignment hole is formed in a lower portion of the upper base, the alignment camera unit is located above the upper base to detect the alignment mark provided in the lower jig through the alignment hole and the lower hole when the upper base is located above the lower base, and the controller controls the second driver to align the upper mold and the lower mold with each other until the alignment camera unit detects the alignment mark through the alignment holes and the lower hole.

10. The molding apparatus of claim 9, wherein the alignment camera unit is located above the lower base, the molding apparatus includes a third driver configured to move the alignment camera unit in a vertical direction, and the controller controls the third driver to move the alignment camera unit upward when the upper base moves to an upper side of the lower base and to move the alignment camera unit downward to approach the upper base when the upper base is located above the lower base.

11. The molding apparatus of claim 8, wherein the lower base includes a gap sensor configured to detect a gap between the lower base and the upper base, and the controller controls the second driver according to detection of the gap sensor to adjust the gap between the lower base and the upper base when the upper base is located above the lower base.

12. The molding apparatus of claim 11, wherein the molding apparatus includes an input unit configured to input information about a gap between the upper base and the lower base, and the controller controls the second driver depending on the gap between the upper base and the lower base, input from the input unit.

* * * * *